United States Patent Office 3,481,043
Patented Dec. 2, 1969

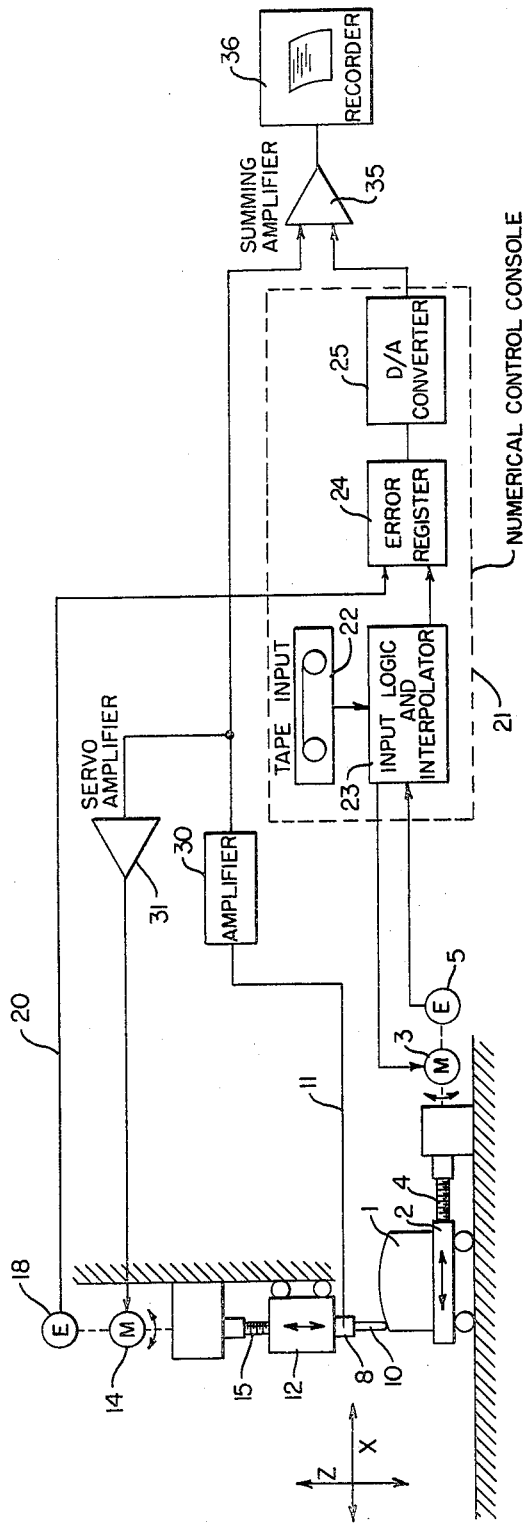

3,481,043
GAGING MACHINE
Robert E. Esch, Kettering, Ohio, assignor to The Bendix Corporation, a corporation of Delaware
Filed Dec. 12, 1967, Ser. No. 690,015
Int. Cl. B23f 23/08; B23q 17/04; G01b 3/00
U.S. Cl. 33—174                              4 Claims

ABSTRACT OF THE DISCLOSURE

A numerically controlled measuring machine particularly adapted for precise measurement of surface contour of parts. Measurements are continuously made along a gaging axis as the transducer means and part are relatively positioned along a second or positioning axis. Reference or nominal gaging signals in the gaging axis are automatically obtained which are correlated with the relative locations along the positioning axis. These reference signals are compared with the measurements obtained to determine the extent of deviation in contour.

BACKGROUND OF THE INVENTION

This invention relates to machines for determining the dimensional configurations of parts.

In machining a part, it is necessary that the cutter or other forming means be located in the proper position relative to the part because it is this position which determines the part configuration. Current machine tools, particularly those involved in numerical control machining, locate the part and cutter with high precision.

Parts produced by such machines must be inspected. Such inspection equipment must by its very nature be of greater precision than the machine which produced the part undergoing inspection. An accepted ratio specifies that the tolerance allowable to the gagemaker is one-tenth of the tolerance allowed in the manufacture of the part to which his equipment will be applied.

In prior known gaging machines of the general type here involved, both the part and the gaging transducer have been positioned with extreme accuracy to nominal positions with the reading of the transducer then indicating deviations of the part from nominal. The problem to the gaging machine manufacturer in machines of that type is one of positioning. This will be apparent when it is considered that available driving and positioning equipment is utilized to its fullest extent in part producing machine tools and the gagemaker's requirement for accuracy is well beyond this in his similar equipment provided for inspection rather than cutting or forming. Even though equipment is available to accurately measure and signal the position of various components in, for example, numerically controlled gaging equipment, the need to direct and drive the transducer and part to the precise relative positions necessary to achieve the required accuracy has required extremely precise and expensive positioning equipment and has in many instances limited the degree of accuracy which could be achieved.

SUMMARY OF THE INVENTION

Through the present invention, the necessity for precise positioning of either the part or transducer is eliminated, making possible greater accuracy in more economical equipment.

In one aspect of the present invention the primary gaging sensor or transducer which provides a gaging signal is carried for movement in the gaging direction. Its signals are used to automatically position the transducer itself toward maintaining a desired reference displacement between transducer and part. It is not essential through the present invention that the transducer positioning be precise because its position is detected and signalled by a second transducer. The joint signals obtained are accurately representative of the disposition of the part surface in the gaging direction irrespective of the positioning accuracy of the primary transducer itself.

In another aspect of the present invention, the necessity for precise positioning is eliminated by signalling the relative positions of part and transducer along a second or positioning axis as gaging signals are obtained along the gaging axis. Data means are included which automatically respond to positioning axis signals to provide correlated nominal signals in the gaging direction. These nominal signals are continuously compared with the gaging signals to detect deviations in part configuration from nominal.

BRIEF DESCRIPTION OF THE DRAWING

The drawing illustrates, in block diagram form, an exemplary embodiment of a machine or system incorporating features of the present invention.

DESCRIPTION OF THE PREFERRED EMBODIMENT

For purpose of illustrating the present invention, an exemplary part 1 has been selected whose configuration or upper contour is defined by correlated displacements along mutually perpendicular axes. The first axis in this illustrative example is Z or vertical and is the one along which displacements of the upper surface of the part which determine its configuration or contour in this direction will be sensed and signalled. In this application, the part itself is bodily and continuously displaced along a second axis, identified as X, which is horizontal and at right angles to the Z axis.

The function of this machine is to explore the configuration and contour of the upper surface of part 1 rapidly and accurately and to determine its deviations from the nominal or desired contour and whether these deviations are within acceptable limits or tolerances. This is accomplished by measuring the displacements of the upper part surface along the Z axis and signalling these displacements while continuously traversing the part along the X axis and signalling the part position along this axis. Output signals along the Z axis are continuously compared with nominal or reference signals for this axis provided by data means controlled by the actual positions of the part along the X axis. While the direction of the part movement in the illustrated embodiment is straight line, it will be appreciated that the relative movement of the part and the transducer of the Z axis could well be rotary or translatory, or a combination of either. Where relative movement is defined herein as being along an axis, it is intended to designate such a relative displacement whether rotary, translatory, or both.

The part 1 is mounted on a carriage 2 supported for movement to the right and left along the X axis. Carriage 2 is driven for movement in this direction by motor 3 through screw drive 4. A rotary encoder 5 acts as a transducer to signal in incremental or digital form the positions of carriage 2 in the X direction.

The primary transducer or signal means in the Z axis is indicated at 8. While such a transducer can be of many forms, in this application is utilized an "Electrojet" cartridge manufactured by The Bendix Corporation. This type transducer includes a differential transformer arrangement wherein a work contacting stylus 10 positions an armature relative to internal windings. When the armature is centered relative to these windings, the signal is nulled. Displacements in either direction from this centered position will result in signals of a magnitude varying with the magnitude of the displacement and of a phase relationship determined by its direction. Such signals are provided through output 11.

Transducer 8 is suported by a carriage 12 driven by motor 14 through screw 15. Transducer 8 thus effectively signals deviations in displacement of the part surface from the reference displacement relative to carriage 12 necessary to null the output of transducer 8.

In most applications, the changing contour of the upper surface of part 1 in the Z direction will exceed the effective gaging range of transducer 8 were the transducer body fixed. The transducer then must be displaced along this axis through the motor 14 and carriage 12, as earlier described, while the carriage position itself is signalled by a transducer encoder 18 providing digital output signals through 20.

Thus it is seen that transducer 8 and encoder 18 jointly signal the disposition of the surface of part 1 along the first or Z axis.

For command signals and data input to the machine or system, a numerical control console 21 is employed. This can be a Bendix Dynapath control manufactured by The Bendix Corporation. This console includes the tape input 22, circuitry providing input logic and interpolator functions 23, an error register 24, and a digital to analog converter 25 provided for purposes as will be later explained. The tape input 22 provides the various major command signals, such as the commencement and termination of functions. It also supplies dimensional data in the form of correlated nominal relationships between X and Z displacements in the form of conventional information blocks. The interpolator of the console interpolates between the points defined and provided by the input tape information and adds additional correlated data in X and Z, along the first and second axes, for points between those provided by the tape input.

In operation, tape input 22 through input logic and interpolator unit 23 provides an output or command signal to motor 3 commencing continuous traverse of carriage 2 and part 1 in a given direction along the second or X axis and relative to transducer 8. The circuit to motor 3 is an open loop rate control.

As the carriage 2 traverses, encoder 5 provides a digital output signal to the console 21 which is responsive to the relative dispositions of transducer 8 and part 1 along the X axis.

The signal from encoder 5 is automatically correlated within console 21 with the input signals from tape input 22, or from the interpolator for points therebetween, and a signal of the nominal or reference displacement of the part surface along the Z axis for that particular relative position along X of transducer 8 and part 1 is provided to error register 24. Such correlated output signals are provided to error register 24 continuously and in digital form as output signals are provided by encoder 5.

The system operating along Z axis is basically of a slave type functioning to drive and position transducer 8 to its null point. Transducer 8 and drive motor 14 for its carriage 12 are effectively in a closed loop. Whenever a signal other than null is provided from transducer 8, it is amplified at 30. It is further amplified in servo amplifier 31 and is provided as an energizing signal to motor 14, automatically driving motor 14 and positioning carriage 12 to move the body of transducer 8 relative to its part engaging stylus 10 to seek the null position although the circuit is not necessarily continuously nulled.

Thus, as carriage 2, and part 1, which it supports, are traversed along the X axis, transducer 8 is continuously positioned to follow the uper contour as a slave positioning not directly under the control of the numerical control unit 21.

As earlier mentioned, the displacement of the upper surface of part 1 in Z direction is thus effectively signalled by the interrelated signals from transducer 8 and from encoder 18 irrespective of the actual positions of carriage 12.

Signals from encoder 18, which are in digital form, are provided directly to error register 24. Error register 24, as earlier described, is also provided with nominal or reference Z axis signals in digital form correlated to the relative positions of the part and transducer in the X axis. In error register 24 the reference signal and output signal from encoder 18 are compared. Any difference is converted from digital form to analog in converter 25 for later comparison with the analog signals from transducer 8. The signals from transducer 8, amplified at 30, are brought to summing amplifier 35, which is also connected to converter 25. Thus, these signals are compared and the difference, which represents the deviations in displacement of the part surface 1 along the Z direction from nominal, is supplied to an output as desired. In illustrated example, these deviations are provided to a recorder 36. The present invention is adaptable to input gaging signals of analog or digital form, or combinations of both, and will provide output signals in analog or digital form, by the use of suitable circuit converters as desired.

Thus, it is seen that a machine or system has been provided for precisely determining the dimensional configuration of the surface of a part rapidly and accurately. the necessity for precise positioning of either transducer or part is eliminated while providing gaging results of the highest accuracy.

While the form of apparatus herein described constitutes a preferred embodiment of the invention, it is to be understood that the invention is not limited to this precise form of apparatus, and that changes may be made therein without departing from the scope of the invention.

What is claimed is:

1. A machine for determining the dimensional configuration of the surface of a part defined nominally by correlated displacements along first and second axes, said machine comprising:

first signal means responsive to the disposition of the surface of a part along said first axis for generating a signal representative of said disposition, second signal means responsive to the relative disposition of said first signal means and said part along said second axis for generating a signal representative of said relative disposition, data means responsive to the signal generated by said second signal means providing reference first axis signals correlated with the relative dispositions of said first signal means and said part along said second axis, and comparison means responsive to deviations between the signal generated by said first signal means and the reference signals of data means for signalling deviation of said surface from a surface corresponding to said reference signals.

2. A machine for determining the dimensional configuration of the surface of a part defined nominally by correlated displacements along first and second axes, said machine comprising:

first signal means responsive to the disposition of the surface of a part along said first axis for generating a signal representative of said disposition, first drive means for relatively positioning the part and said first signal means along said first axis, second signal means responsive to the position of said first signal means along said first axis for generating a signal representative of said disposition, second drive means for relatively positioning said part and said first signal means along a second axis, third signal means responsive to the relative disposition of said first signal means and said part along second axis for generating a signal representative of said relative disposition, data means responsive to the signal generated by said third signal means providing reference first axis signals correlated with the relative disposition of said first signal means and part along said second axis, and comparison means responsive to both said first and said second signal means and thus to the displacement of the part surface along said first axis for comparing such displacement with the reference first axis signals as correlated with the relative positions of the first signal means and part along the second axis.

3. A machine for determining the dimensional configuration of a part, said machine comprising:

a base, means for supporting a part to be measured on said base, a carrier mounted for movement on said base along a gaging axis intersecting the surface of said part, first signal means on said carrier responsive to deviations in displacement of the part surface along said gaging axis from a reference relative displacement with respect to said carrier for generating a signal representative of said deviation, drive means for positioning said carrier along the gaging axis, control means responsive to the signal generated by said first signal means operatively connected to said means for control thereof and movement of said carrier in a direction to reduce deviations from the reference displacement between part and carrier, second signal means responsive to the position of said carrier along the gaging axis and with respect to said base and the part supported thereon for generating a signal representative of said position, and means combining the signals from said first and second signal means for signalling the displacement of said part surface along the gaging axis irrespective of the accuracy of positioning of said carrier.

4. A machine for determining the dimensional configuration of the surface of a part defined nominally by correlated displacement along a positioning axis and a gaging axis, said machine comprising:

a base, a movable support on said base for carrying a part to be measured along said positioning axis, a carrier mounted for movement on said base along said gaging axis intersecting the surface of said part, first signal means on said carrier responsive to deviations in displacement of the part surface along said gaging axis from a reference relative displacement with respect to said carrier for generating a signal representative of said deviations, drive means for positioning said carrier along the gaging axis, control means responsive to the signal generated by said first signal means operatively connected to said drive means for control thereof and movement of said carrier in a direction to reduce deviations from the reference displacement between part and carrier, second signal means responsive to the position of said carrier along the gaging axis and with respect to said base and the part supported thereon for generating a signal representative of said position, third signal means responsive to the relative disposition of said first signal means and said support and part along said positioning axis for generating a signal representative of said relative disposition, data means responsive to the signal generated by said third signal means providing reference gaging axis signals correlated with the relative disposition of said first signal means and part along said positioning axis, and means responsive to signals generated by said first and second signal means and said reference gaging axis signals as correlated with the relative positions of the first signal means and part along the positioning axis for providing output signals representative of the deviation of said part surface from a surface corresponding to said reference signals.

References Cited

UNITED STATES PATENTS

| | | | |
|---|---|---|---|
| 2,835,042 | 5/1958 | Tandler et al. | 33—174 |
| 2,901,105 | 8/1959 | Harder | 33—174 |
| 3,135,055 | 6/1964 | Butler et al. | 33—174 |
| 3,250,012 | 5/1966 | Hilton et al. | 33—174 |

SAMUEL S. MATTHEWS, Primary Examiner

UNITED STATES PATENT OFFICE
CERTIFICATE OF CORRECTION

Patent No. 3,481,043          Dated December 2, 1969

Inventor(s) Robert E. Esch.

It is certified that error appears in the above-identified patent and that said Letters Patent are hereby corrected as shown below:

IN THE SPECIFICATION

Column 3, line 3, "...suported..." should read --supported--.

Column 4, line 25, "...the..." should read --The---.

IN THE CLAIMS

Claim 3: Column 5, line 26, --drive-- should be inserted before "...means..."

SIGNED AND
SEALED
OCT 6 - 1970

(SEAL)
Attest:

Edward M. Fletcher, Jr.                WILLIAM E. SCHUYLER, JR.
Attesting Officer                      Commissioner of Patents